United States Patent [19]

Willmott

[11] 4,057,710
[45] Nov. 8, 1977

[54] KEYBOARD ASSEMBLY

[76] Inventor: Arthur S. Willmott, 59 E. 2nd St., Mineola, N.Y. 11501

[21] Appl. No.: 671,179

[22] Filed: Mar. 29, 1976

[51] Int. Cl.² ............................................. G06C 7/02
[52] U.S. Cl. ........................... 235/145 R; 200/159 B; 200/5 A
[58] Field of Search ................. 200/159 B, 340, 5 A, 200/302; 235/145 R; 74/18; 197/102, 98, 100; 29/418; 264/161, 259, 261, 251, 241, 250, 294, 263, 255, 328, 138, 267, 254

[56] References Cited

U.S. PATENT DOCUMENTS

| 2,086,066 | 7/1937 | Churchill | 200/159 B |
| 2,492,973 | 1/1950 | Dofsen et al. | 264/161 X |
| 2,510,091 | 6/1950 | Dofsen et al. | 264/161 |
| 3,627,927 | 12/1971 | Schmitz et al. | 197/98 X |
| 3,668,938 | 6/1972 | Dimitry | 200/302 X |
| 3,693,775 | 9/1972 | Brooks et al. | 235/145 R X |
| 3,699,294 | 10/1972 | Sudduth | 200/159 B X |
| 3,823,309 | 7/1974 | Caruso | 235/145 R |

Primary Examiner—Ulysses Weldon
Attorney, Agent, or Firm—Kenneth S. Goldfarb

[57] ABSTRACT

A keyboard assembly comprising a plurality of actuating keys, and a sheet of flexible thin plastic film, the keys being bonded to the film. The keys have upper and lower portions, said lower portions being sandwiched between said upper portions and film and bonded to each.

2 Claims, 6 Drawing Figures

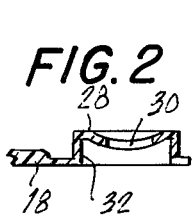
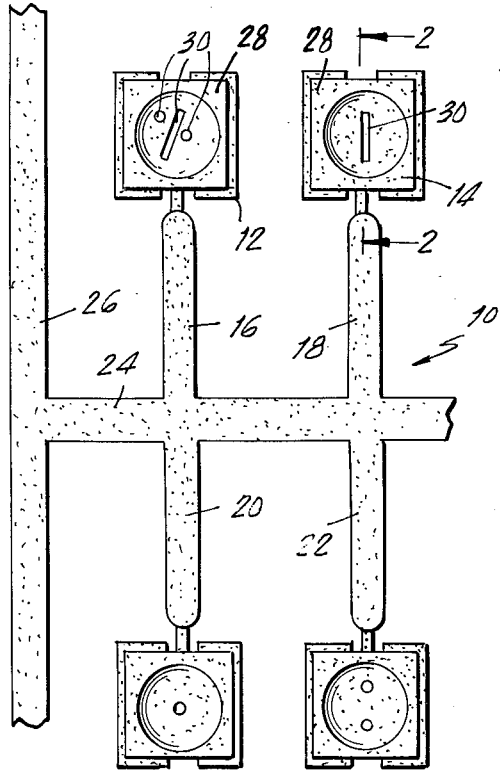
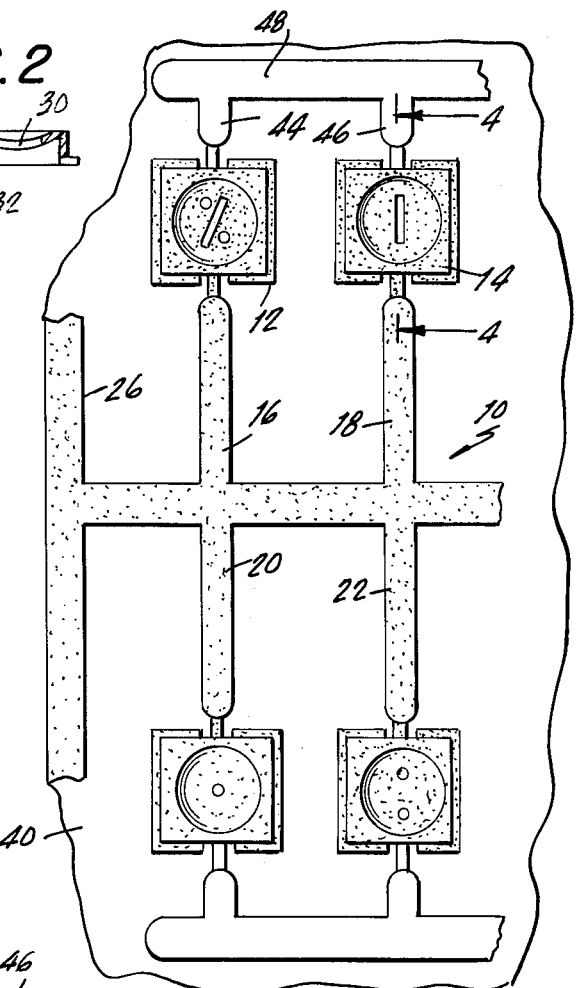
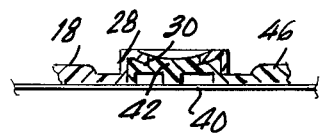
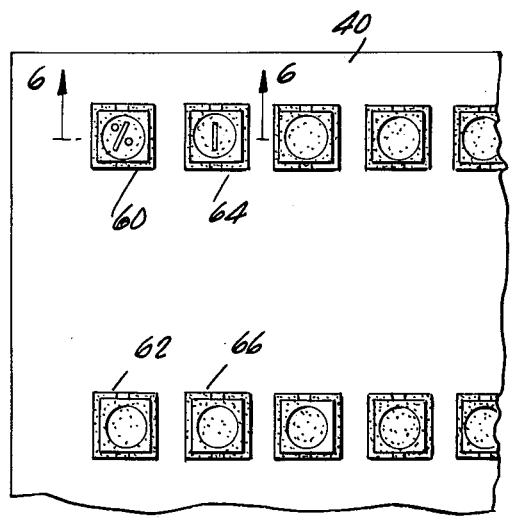
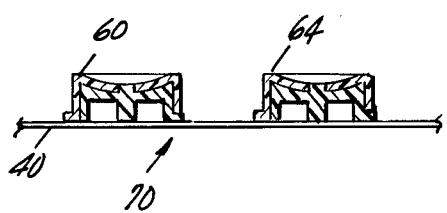

KEYBOARD ASSEMBLY

BACKGROUND OF THE INVENTION

1. Field of the Invention

This invention relates to a novel keyboard assembly and method of making said keyboard assembly.

2. Description of Prior Art

A wide variety of mechanisms have been devised which employ keyboard actuators. Such keyboard actuators are provided for devices including pocket calculators, telephone sets, radio sets, and various electronic and electrical devices which initiate operation or function upon depression of a key which actuates a responsive mechanism. In the past keys for keyboards have been separately molded and then placed in jigs or dies for mass production assembly. However, the step of positioning the proper keys in the jig is time consuming.

SUMMARY OF THE PRESENT INVENTION

The present invention has the concept of first molding a first set of key portions, with the runners therefore extending inwardly between the key portions. A thin sheet of plastic film is introduced into the mold. Then a second series of key portions is molded onto the plastic film bonding the film to first series of key portions and said second series of key portions. The first series of key portions may have indicia shaped openings therein through which indicia formed of the second series of key portions of a different color an visible. The runners for the second series of key portions are disposed outwardly of said key portions. The first runners are not bonded to the film and are easily removed. The film and the second runners are out about the periphery of the keyboard assembly leaving only the keys and the film which is ready for installation without need for a jig to hold the keys.

These, together with the various ancillary features and objects of the invention are allowed by this keyboard assembly and method of making the keyboard assembly, a preferred embodiment being shown in the accompanying drawing, by way of example only, wherein:

BRIEF DESCRIPTION OF DRAWING

FIG. 1 is partial plan view of a first steps in molding the keyboard assembly;

FIG. 2 is a sectional detail view taken along the plane of line 2—2 in FIG. 1;

FIG. 3 is a view similiar to FIG. 1, after a second molding operation;

FIG. 4 is a sectional detail view taken along the plane of line 4—4 in FIG. 3;

FIG. 5 is a partial plan view of the completed keyboard assembly; and.

FIG. 6 is a sectional detail view taken along the plane of line 6—6 in FIG. 5.

DETAILED DESCRIPTION OF THE INVENTION

With continuing reference to the accompanying drawing wherein like reference numerals designate similiar parts throughout the various view, reference numeral 10 illustrates a first molded shot of the partially formed keyboard assembly. Initially, the molded shot 10 is injection molded using any suitable synthetic plastic material such as, but not limited, polyethylene, polypropylene, polyvinyl chloride, polystyrene and the like. The shot 10 includes a plurality of upper key portions 12, 14 etc interconnected by feed runners for 16, 18, 20, 22 etc. delivering molten plastic to that portion of the mold forming the upper key portions. These feed runners extend between the key portions inwardly of the keys to be formed. The feed runners in turn receive molten plastic from branch runners 24 which in turn are feed by a main runner 26, the various runners being formed by residual plastic left in sprues and conduits for the molten plastic in the mold. Each key portion is of any suitable shape such a square, round, rectangular. As shown the key portion 14 has a concave top wall 28 provided with a cutout 30 conforming to numeral, sign, or letter indicia in this case the numeral 1. The key portion has depending side walls 32.

After the shot 10 is formed by injection molding, it is transferred to a second mold. A sheet 40 of thin film material compatible with the plastic used in molding the key portions and transparent is introduced into the mold and a second amount of plastic material of a different and contrasting color is introduced into the mold in a heated molten state bonding to the sheet 40 forming lower key portions 42, feed runners 44, 46, etc. outwardly of the key portions and which are connected to main runners 48. The second plastic material fills the openings 30 forming a readily readable indicia.

Then the film and the second feed runners 44, 46, etc, are cut outwardly of the keys and the first runners 16, 18, 20, 22 etc, not bonded to the film are broken away so that only the keys 60, 62, 64, 66, etc and the film sheet 40 remain as a completed keyboard assembly 70.

The keyboard assembly 70 can be then inserted in the calculator or like device, with the cover plate placed thereover without removing the sheet 40 which forms a protective air and moisture tight seal and strength ens the entire assembly.

A latitude of modification, substitution and change is intended in the foregoing disclosure, and in some instances, some features of the present invention may be employed without a corresponding use of other features.

I claim:

1. A method of making a keyboard assembly in which a sheet of thin flexible plastic film is bonded to a series of key portions arranged in a predetermined order, comprising the steps of molding a first series of key portions in a first mold, placing said first series of key portions into a second mold, introducing said film into said second mold, and then molding a second series of key portions underlying said first series of key portions to bond said film to said first key portions in said mold, said first series of key portions being provided with first runners extending between the key portions inwardly of said first series of key portions, and said second series of key portions being provided with runners outwardly of said second series of key portions, breaking away said first runners from said first series of key portions without breaking the bond between said film and said key portions.

2. A method according to claim 1, including the step of cutting said film and said runners outwardly of said series of key portions so that only said key portions and said film remain as a keyboard assembly.

* * * * *